United States Patent
Andorko et al.

(10) Patent No.: US 11,361,525 B2
(45) Date of Patent: Jun. 14, 2022

(54) ELECTRONIC DEVICE FOR PERFORMING BIOMETRIC IDENTIFICATION

(71) Applicant: FotoNation Limited, Galway (IE)

(72) Inventors: Istvan Andorko, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 1 day.

(21) Appl. No.: 16/882,918

(22) Filed: May 26, 2020

(65) Prior Publication Data

US 2020/0387728 A1 Dec. 10, 2020

Related U.S. Application Data

(60) Provisional application No. 62/858,202, filed on Jun. 7, 2019.

(51) Int. Cl.
*G06K 9/20* (2006.01)
*G06V 10/143* (2022.01)
(Continued)

(52) U.S. Cl.
CPC .......... *G06V 10/143* (2022.01); *G06V 40/166* (2022.01); *G06V 40/172* (2022.01); *G06V 40/197* (2022.01); *G06V 40/70* (2022.01); *H04M 1/0264* (2013.01); *H04M 1/0266* (2013.01); *H04M 2250/52* (2013.01)

(58) Field of Classification Search
CPC .............. G06K 9/00221–2009/00328; G06K 9/00597–9/00617; G06V 40/166
See application file for complete search history.

(56) References Cited

U.S. PATENT DOCUMENTS

| 2017/0336836 A1* | 11/2017 | Morsky | G06F 21/32 |
| 2020/0020671 A1* | 1/2020 | Lu | H05B 45/00 |
| 2020/0293757 A1* | 9/2020 | Nilsson | H04N 5/232 |

FOREIGN PATENT DOCUMENTS

KR 101276345 B1 * 6/2013 ............... G06K 9/46

OTHER PUBLICATIONS

Thavalengal et al., "Proof-of-Concept and Evaluation of a Dual Function Visible/NIR Camera for Iris Authentication in Smartphones", IEEE publication, copyright 2015, pp. 137-143. (Year: 2015).*

* cited by examiner

*Primary Examiner* — Brian Werner
(74) *Attorney, Agent, or Firm* — Lee & Hayes, P.C.

(57) ABSTRACT

This disclosure describes, in part, devices and techniques for performing biometric identification for an electronic device. For instance, the electronic device may include one or more near-infrared illuminators that output near-infrared light. The one or more near-infrared illuminators may be located in or on a bezel and/or a display of the electronic device. The electronic device may also include an imaging device that generates first image data representing the near-infrared light and visible light. After generating the image data, the electronic device may process the first image data using one or more image processing techniques to generate second image data representing a near-infrared image and third image data representing a visible image. The electronic device may then analyze the second image data and/or the third image data using one or more biometric identification techniques. Based on the analysis, the electronic device may identify a person possessing the electronic device.

20 Claims, 9 Drawing Sheets

(51) Int. Cl.
*H04M 1/02* (2006.01)
*G06V 40/70* (2022.01)
*G06V 40/16* (2022.01)
*G06V 40/18* (2022.01)

ELECTRONIC DEVICE FOR PERFORMING
BIOMETRIC IDENTIFICATION

BACKGROUND

Mobile phones may use facial recognition in order to identify users of the mobile phones. The mobile phones may then perform various processes based on identifying the users, such as unlocking the mobile phones or opening applications executing on the mobile phones. Mobile phones that have facial recognition technology require multiple cameras and at least one light source located at the front of the mobile phones in order to both capture the images required to perform facial recognition as well as capture images that are taken by the user during normal use of the mobile phones. However, by including the multiple cameras and light source located at the front of the mobile phones, notches and/or cutouts for the cameras and light source may be located within displays of the mobile phones. This causes problems, since large portions of the displays are removed for the notches and/or cutouts.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
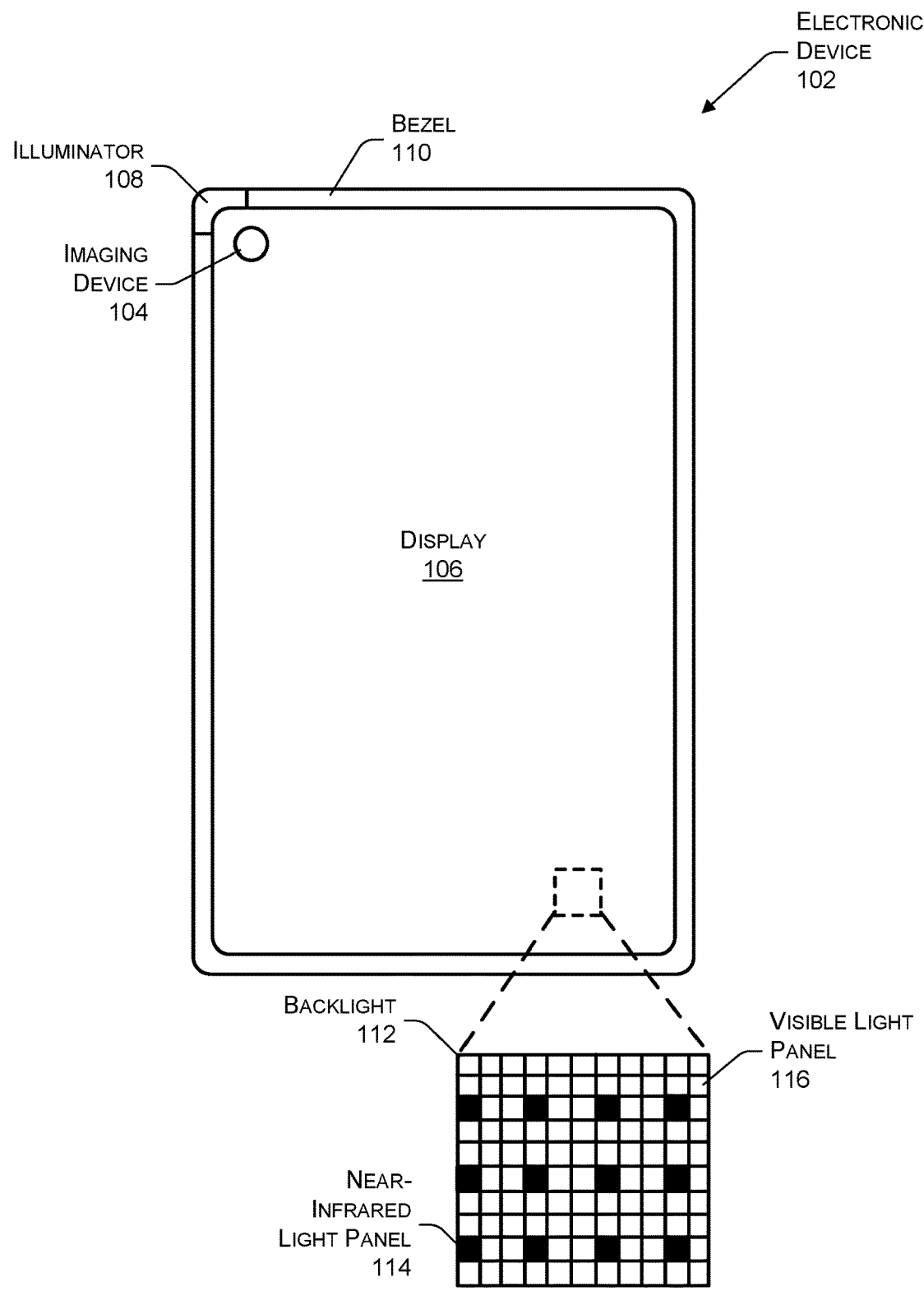
FIG. 1 illustrates an example electronic device that is capable of performing the biometric identification techniques described herein.

As discussed above, mobile phones may use facial recognition in order to identify users of the mobile phones. Mobile phones that have facial recognition technology require multiple cameras and at least one light source located at the front of the mobile phones in order to both capture the images required to perform facial recognition as well as capture images that are taken by the user during normal use of the mobile phones. However, by including the multiple cameras and light source located at the fronts of the mobile phones, notches and/or cutouts for the cameras and light source may be located within displays of the mobile phones. This causes problems, since large portions of the displays are removed for the notches and/or cutouts.

As such, the present application is directed to an electronic device, such as a mobile device (e.g., mobile phone, tablet, laptop, etc.), that uses a single imaging device to both perform biometric identification techniques as well as capture images during normal use of the electronic device. For instance, the imaging device of the electronic device may be configured to generate image data representing both visible light and near-infrared light (and/or infrared light). To generate the image data, the electronic device may include one or more near-infrared light emitters that output the near-infrared light while the imaging device generates the image data. The electronic device may then process the image data using one or more image signal processors (ISPs) in order to generate image data representing at least one non-infrared image and image data representing at least one visible image. The electronic device may then analyze, using one or more biometric identification techniques, the image data representing the at least one non-infrared image and/or the image data representing the at least one visible image in order to identify a person in possession of the electronic device. By using a single camera, an amount of the display screen that is occupied (e.g., by a notch or cutout for the camera) is minimized, thereby maximizing an amount of the display screen available to display images and other content.

For example, the imaging device may include at least an image sensor, a dual band-pass filter, and a lens barrel. In some instances, the image sensor may be capable of capturing both visible light and near-infrared light (and/or infrared light). Additionally, the dual-band pass filter may be configured to filter various frequencies of light. For instance, the dual-band pass filter may be configured to pass frequencies of light that fall within at least a portion of the visible light spectrum and at least a portion of the near-infrared light spectrum (and/or at least a portion of the infrared light spectrum), while rejecting other frequencies of light. For example, the imaging device may include a Red-Green-Blue (RGB)-Infrared (IR) camera, such as, but not limited to, a RGB-IR complementary metal oxide semiconductor (CMOS) camera with Deep Trench Isolation (DTI), a RGB-Clear CMOS, and/or the like.

The electronic device may include at least one near-infrared illuminator that outputs the near-infrared light captured by the imaging device. In some examples, the near-infrared illuminator is included in the backlight of a display of the electronic device. For example, one or more panels of the backlight may include near-infrared light panels that output the near-infrared light. Additionally, or alternatively, in some examples, the near-infrared illuminator is included in at least a portion of the electronic device, such as the bezel of the electronic device. As described in more detail below, in examples where the near-infrared illuminator is only included in the backlight of the display, the electronic device may be capable of performing specific biometric identification techniques, such as facial recognition. Additionally, in examples where the near-infrared illuminator is included in the bezel of the electronic device, the electronic device may be capable of performing additional biometric techniques, such as facial recognition and iris recognition. Additionally, because the near-infrared illuminator of these examples does not occupy or obstruct any portion of the display screen, an amount of the display screen that is available to display images and other content is maximized.

The electronic device may include one or more ISPs that process the image data (referred to, in these examples, as "first image data") generated by the image sensor. For example, the electronic device may process the first image data using a first ISP in order to generate data representing the near-infrared light, such as image data (referred to, in these examples, as "second image data") representing at least one near-infrared light image. The electronic device may also process the first image data using the first ISP in order to generate data representing the visible light, such as image data (referred to, in these examples, as "third image data") representing at least one visible light image. Additionally, in some examples, the electronic device may process the third image data using a second ISP in order to generate additional data representing the visible light, such as image data (referred to, in these examples, as "fourth image data") representing at least one visible light image.

The electronic device may then process the processed image data using one or more biometric identification techniques. For a first example, the electronic device may process the second image data using one or more facial recognition techniques. Based at least in part on the processing, the electronic device may determine if the second image data represents a face of a user and/or determine an identity of a person represented by the second image data. For a second example, the electronic device may process the second image data using one or more iris recognition techniques. Based at least in part on the processing, the electronic device may determine if the second image data represents one or more eyes of the user and/or determine an identity of the person represented by the second image data.

For a third example, the electronic device may process the fourth image data using one or more facial recognition techniques. The one or more facial recognition techniques used to process the fourth image data may the same as and/or different from the one or more facial recognition techniques used to process the second image data. Based at least in part on the processing, the electronic device may determine if the fourth image data represents the face of the user and/or determine an identity of the person represented by the fourth image data. Still, for a fourth example, the electronic device may process the fourth image data using one or more iris recognition techniques. The one or more iris recognition techniques used to process the fourth image data may the same as and/or different from the one or more iris recognition techniques used to process the second image data. Based at least in part on the processing, the electronic device may determine if the fourth image data represents the one or more eyes of the user and/or determine an identity of the person represented by the fourth image data The electronic device may then determine one or more processes or operations to perform based on the results of the biometric identification techniques. For example, the electronic device may determine to "unlock" when at least one or more of the biometric identification techniques identifies the user. For another example, the electronic device may determine to "unlock" when all of the biometric identification techniques identify the user. In other examples, besides just unlocking, the electronic device may perform one or more additional and/or alternatively processes, such as launching an application, logging into the application, confirming a purchase, or any other operation that requires or makes use of a authentication of the user.

In some instances, the processes described herein may be enabled by electronic devices having various specifications. For example, the image sensor of the imaging device may include at least a minimum sensor resolution, such as, but not limited to, 1920×1080, 2048×1536, 4000×3000, and/or any other sensor resolution sufficient to perform facial recognition and/or iris recognition. The horizontal field of view (FOV) of the imaging device may include, but is not limited to, 60 degrees, 80 degrees, 100 degrees, and/or any other horizontal FOV. Additionally, the vertical FOV of the imaging device may include, but is not limited to, 55 degrees, 65 degrees, 75 degrees, and/or any other vertical FOV. Furthermore, the lens Modulation Transfer Function (MTF) may be at least 1 line per millimeter (lp/mm) at MTF60 when the electronic device is capable of performing facial recognition techniques, or may be at least 2 lp/mm at MTF 60 when the electronic device is capable of performing facial recognition techniques and iris recognition techniques.

In some instances, the near-infrared illuminator(s) may provide extra illumination in order to both provide the necessary illumination for performing the biometric identification techniques as well as improve the quality of the images captured by the imaging device. For example, the near-infrared illuminator(s) may provide an illumination that includes, but is not limited to, 780 nm, 940 nm, 1050 nm, and/or any other illumination. Additionally, the near-infrared illuminator(s) may provide the necessary radiant intensity for performing the biometric identification techniques. For example, the near-infrared illuminator(s) may provide a radiant intensity of at least 500 megawatts per steradian (mW/sr) at a 45 degree half angle for the facial recognition and a radiant intensity of at least 2,500 mW/sr at a 10 half degree angle for the iris recognition.

Since the electronic device includes at least one near-infrared illuminator and an imaging device that is capable of capturing near-infrared light, the electronic device is capable of both performing biometric identification techniques and capturing quality images using a single imaging device. This way, when the electronic device includes a mobile device, such as a mobile phone, the electronic device may not be required to include a large notch and/or cutout located at the front of the electronic device since the front of the electronic device may only include the single imaging device. Additionally, by having the one or more near-infrared illuminators in or on the display and/or bezel, the one or more near-infrared illuminators do not take up part of the display. As such, even though the electronic device may only include the single imaging device, the electronic device is capable of performing multiple biometric techniques in order to identify a person in possession of the electronic device, which may increase the security of the electronic device.

FIG. 1 illustrates an example electronic device 102 that is capable of performing the biometric identification techniques described herein. As shown in the example of FIG. 1, the electronic device 102 includes an imaging device 104 located at a top-left corner of a display 106. However, in other examples, the imaging device 104 may be located at a different position of the display 106. In some instances, and as described in more detail with regard to FIGS. 2-4, the imaging device 104 includes a single camera that is capable of capturing both visible light and near-infrared light (and/or infrared light). As such, the imaging device 104 does not require a large opening within the display 106 to operate as intended.

The electronic device 102 may further include at least one illuminator. For example, the electronic device 102 may include an illuminator 108 located within a bezel 110 of the electronic device 102. The illuminator 108 may include, but is not limited to, a near-infrared illuminator, an infrared illuminator, and/or any other type of illuminator. By using a near-infrared illuminator, the electronic device 102 is capable of performing the biometric identification techniques described herein. In the example of FIG. 1, the illuminator 108 is located in the top-left corner of the bezel 110. However, in other examples, the illuminator 108 may be located in the top portion of the bezel 110, the top-right corner of the bezel 110, the right portion of the bezel 110, the bottom-right corner of the bezel 110, the bottom portion of the bezel 110, the bottom-left corner of the bezel 110, and/or the left portion of the bezel 110. Additionally, in other examples, the electronic device 102 may include more than one illuminator located within the bezel 110.

The electronic device 102 may additionally or alternatively include an illuminator located within a backlight 112 (or elsewhere in a display stack) of the display 106. For example, and as illustrated in FIG. 1, the backlight 112 may include one or more near-infrared panels 114 (although only one is labeled for clarity reasons), which are illustrated by the black squares, as well as visible light panels 116 (although only one is labeled for clarity reasons), which are illustrated as the white squares. As such, the backlight 112 of the display 106 is capable of outputting both visible light using the visible light panels 116 and near-infrared light using the near-infrared light panels 114. In some instances, the percentage of near-infrared light panels 114 out of the total number of panels and the pattern/position of the near-infrared light panels 114 in the display 106 is selected such that the near-infrared panels 114 are not visible to a person during normal use of the electronic device 102 and the image is not perceptibly degraded, but the near-infrared panels 114 still provide the required amount of near-infrared light. For example, the percentage of near-infrared light panels 114 may be about, but is not limited to, 0.01%-0.1%, 0.5%-1%, 1%-2%, and/or any other range.

Although the example of FIG. 1 illustrates the near-infrared light panels 114 as being evenly distributed about the backlight 112, in other examples, the near-infrared light panels 114 may not be evenly distributed about the backlight 112. For example, a greater percentage of the near-infrared light panels 114 may be located at a portion of the backlight 112 than other portions of the backlight 112. Additionally, although the example of FIG. 1 illustrates the electronic device 102 as including a mobile phone, in other examples, the electronic device 102 may include another type of device. For example, the electronic device may include, but is not limited to, a computer, a laptop, a tablet, an automation device (e.g., a door lock, etc.), a vehicle, and/or any other type of device.

Figure 2:
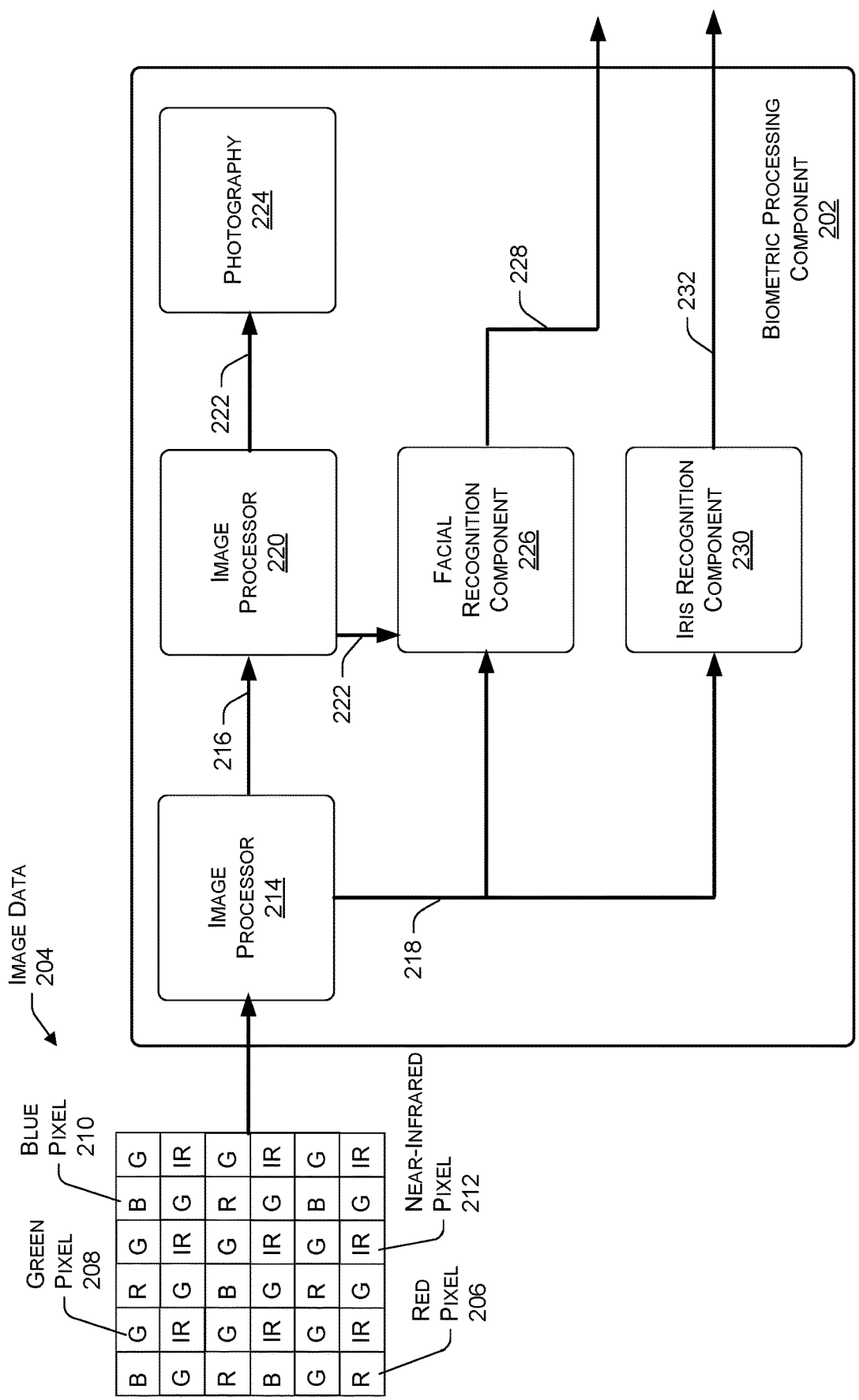
FIG. 2 illustrates an example of performing biometric identification techniques using image data generated by the imaging device of FIG. 1.

FIG. 2 illustrates an example of a biometric processing component 202 performing biometric identification techniques using image data 204 generated by the imaging device 104 of FIG. 1. As shown, the image data 204 represents red pixels 206, green pixels 208, blue pixels 210, and infrared pixels 212. For example, the imaging device 104 may allow the near-infrared light, which is output by the illuminator 108 and/or the near-infrared light panels 114, to be passed to the infrared pixels 212. While this is just one example layout for the filter array of the image data 204, in other examples, the filter array may include any other layout. For example, the image data 204 may include less infrared pixels 212 or more of the infrared pixels 212.

As shown, the biometric processing component 202 may include a first image processor 214 (e.g., a first ISP) that is configured to initially process the image data 204. In some instances, the first image processor 214 processes the image data 204 by splitting the image data 204 in order to generate first data 216 representing the RBG pixels and second data 218 representing the infrared pixels. In some instances, the first data 216 may include image data representing one or more visible images and the second data 218 may include image data representing one or more infrared and/or near-infrared images. Additionally, or alternatively, in some instances, the first data 216 may include pseudo-Bayer data that can be processed by a second image processor 220 (e.g., a second ISP) of the biometric processing component 202.

For example, the first image processor 214 may remove any residual IR data from the RGB components of the image data 204. The first image processor 214 may further generate new G components (e.g., green components) in order to create a RAW Bayer RGGB image, which may be represented by the first data 216. In some instances, the residual IR data is removed using information from a prior calibration of the imaging device 104 and/or by analyzing neighboring pixels in the image.

For example, the second image processor 220 may process the first data 216 in order to generate third data 222. In some instances, to process the first data 216, the second image processor 220 may take the red pixels 206, the green pixels 208, and the blue pixels 210 from the first data 216 and calculate full resolution colored images, which may be represented by the third data 222. The second image processor 220 may execute one or more algorithms that correct the imaging device's 104 lens shading and curvature, reduce noise, and/or perform other image quality processing. The third data 222 is then provided as photography 224 for the electronic device 102. For example, the electronic device 102 may display image(s) represented by the third data 222 as photography 224 for the user.

The biometric processing component 202 further includes a facial recognition component 226 that is configured to process data in order to identify a person represented the data. For a first example, the facial recognition component 226 may process the second data 218 using one or more machine-learned models associated with facial recognition. In some instances, based on the processing, the facial recognition component 226 may determine if the second data 218 represents a user associated with the electronic device 102. Additionally, or alternatively, in some instances, based on the processing, the facial recognition component 226 may determine an identity of a person represented by the second data 218. In either instance, the facial recognition component 226 may then output fourth data 228 indicating whether the second data 218 represents the user and/or the identity of the person represented by the second data 218.

For a second example, the facial recognition component 226 may process the third data 222 using one or more machine-learned models associated with facial recognition. The one or more machine-leaned models used to process the third data 222 may be the same as and/or different than the one or more machine-learned models used to process the second data 218. In some instances, based on the processing, the facial recognition component 226 may determine if the third data 222 represents the user associated with the electronic device 102. Additionally, or alternatively, in some instances, based on the processing, the facial recognition component 226 may determine the identity of the person represented by the third data 222. In either instance, the facial recognition component 226 may then output fourth data 228 indicating whether the third data 222 represents the user and/or the identity of the person represented by the third data 222.

The biometric processing component 202 further includes an iris recognition component 230 that is configured to process data in order to identify a user represented the data. For example, the iris recognition component 230 may process the second data 218 using one or more machine-learned models associated with iris recognition. In some instances, based on the processing, the iris recognition component 230 may determine if the second data 218 represents the user associated with the electronic device 102. Additionally, or alternatively, in some instances, based on the processing, the iris recognition component 230 may determine the identity of the person represented by the second data 218. In either instance, the iris recognition component 230 may then output fifth data 232 indicating whether the second data 218 represents the user and/or the identity of the person represented by the second data 218.

As described herein, a machine-learned model which may include, but is not limited to, a neural network (e.g., You Only Look Once (YOLO) neural network, VGG, DenseNet, PointNet, convolutional neural network (CNN), stacked auto-encoders, deep Boltzmann machine (DBM), deep belief networks (DBN),), regression algorithm (e.g., ordinary least squares regression (OLSR), linear regression, logistic regression, stepwise regression, multivariate adaptive regression splines (MARS), locally estimated scatterplot smoothing (LOESS)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), supervised learning, unsupervised learning, semi-supervised learning, etc. Additional or alternative examples of neural network architectures may include neural networks such as ResNet50, ResNet101, VGG, DenseNet, PointNet, and the like. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc.

In some instances, the facial recognition approaches may include, but are not limited to, Local approaches (e.g., Key-Points-Based Techniques, Local Appearance-Based Techniques, etc.), Holistic approaches (Linear Techniques, Non-linear Techniques, etc.), Hybrid approaches (e.g., Local+Holistic Techniques, etc.) and/or any other facial recognition approach. For example, the facial recognition techniques may include, but are not limited to, Local Binary Pattern (LBP), Histogram of Oriented Gradients (HOG), Correlation Filters, Scale Invariant Feature Transform (SIFT), Speed-Up Robust Features (SURF), Eigenface and Principal Component Analysis (PCA), Independent Component Analysis (ICA), Discrete Cosine Transform (DCT), Kernel Linear Discriminant Analysis (KPCA), and/or any other facial recognition technique.

For an example of performing facial recognition, the facial recognition component 226 may identify facial features by extracting landmarks, or features, from at least one near-infrared image (and/or from at least one visible image). For example, the facial recognition component 226 may analyze the relative position, size, and/or shape of the eyes, nose, cheekbones, and jaw. The facial recognition component 226 may then compare these features with to at least one previous stored image representing one or more faces of one or more people. Based on the comparison, the facial recognition component 226 may identify a match between the face represented by the near-infrared image and a face represented by a previously stored image and use the match to identify the person. While this is just one example process for performing facial recognition, in other examples, the facial recognition component 226 may use one or more additional and/or alternative processes.

In some instances, by performing the processes described herein with the hardware/software components of the electronic device 102, the electronic device 102 may provide specific facial recognition specifications. For example, the electronic device 102 may provide at least a false acceptance rate (FAR) of 1:100,000 at a 1% false recognition rate (FRR). The electronic device 102 may also provide anti-spoofing technology. Additionally, the electronic device 102 may provide a low execution time when performing the facial recognition, such as, but not limited to, less than 200 milliseconds. Furthermore, the electronic device 102 may include wide operating angles such as, but not limited to, a yaw angle of ±30 degrees, a pitch of +20 degrees/−45 degrees, and a roll of ±30 degrees.

In some instances, the iris recognition techniques may include, but are not limited to, the Monro Iris Recognition algorithm, the Avila algorithm, the Li Ma algorithm, the Tisse algorithm, the Daugman algorithm, and/or any other iris recognition techniques. For an example of performing iris recognition, the iris recognition component 230 may localize the inner and outer boundaries of an iris represented by at least one near-infrared image. Subroutines may then detect and exclude eyelids, eyelashes, and specular reflections. The set of pixels containing only the iris is then normalized and analyzed to extract a pattern encoding the information needed to compare the near-infrared image to at least one previous stored image representing one or more irises of one or more people. Based on the analysis, the iris recognition component 230 may identify a match between the iris represented by the near-infrared image and an iris represented by a previously stored image and use the match to identify the person. While this is just one example process for performing iris recognition, in other examples, the iris recognition component 230 may use one or more additional and/or alternative processes.

In some instances, by performing the processes described herein with the hardware/software components of the electronic device 102, the electronic device 102 may provide specific iris recognition specifications. For example, the electronic device 102 may provide at least a FAR of 1:100,000 at a 1% FRR. The electronic device 102 may also provide indoor/outdoor authentication with inclusions (e.g., glasses, contact lenses, etc.). Additionally, the electronic device 102 may provide a low execution time when performing the iris recognition, such as, but not limited to, less than 50 milliseconds. Furthermore, the electronic device 102 may include wide operating angles such as, but not limited to, a roll angle of ±30 degrees and an off-axis angle of up to 20 degrees.

Figure 3:
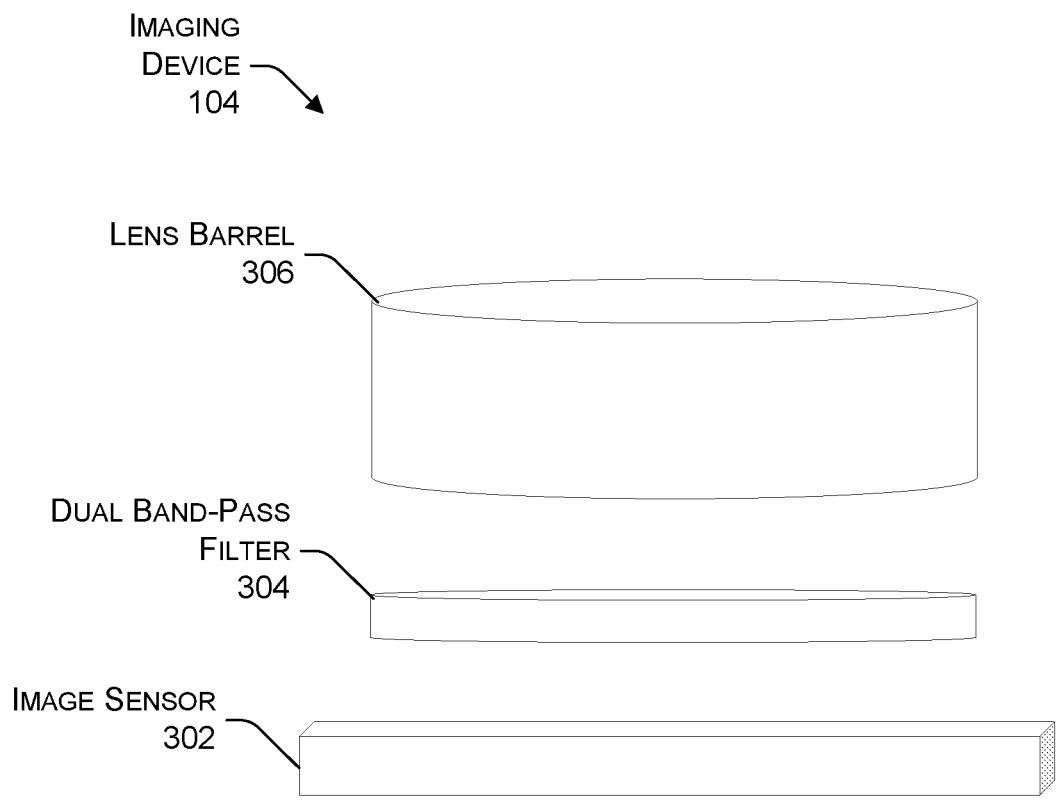
FIG. 3 illustrates components of an example of the imaging device usable with the example electronic device of FIG. 1.

FIG. 3 illustrates an example of the imaging device 104 from the electronic device 102 of FIG. 1. As shown, the imaging device 104 may include at least an image sensor 302, a dual band-pass filter 304, and a lens barrel 306. In some instances, the image sensor 302 may be capable of capturing both visible light and near-infrared light (and/or infrared light). Additionally, the dual band-pass filter 304 may be configured to filter various frequencies of light. For instance, the dual band-pass filter 304 may be configured to pass frequencies of light that fall within at least a portion of the visible light spectrum and at least a portion of the near-infrared light spectrum (and/or at least a portion of the infrared light spectrum), but reject other frequencies of light. As such, and in some examples, the imaging device 104 may include a RGB-IR camera, such as, but not limited to, a RGB-IR CMOS camera with DTI.

Figure 4:
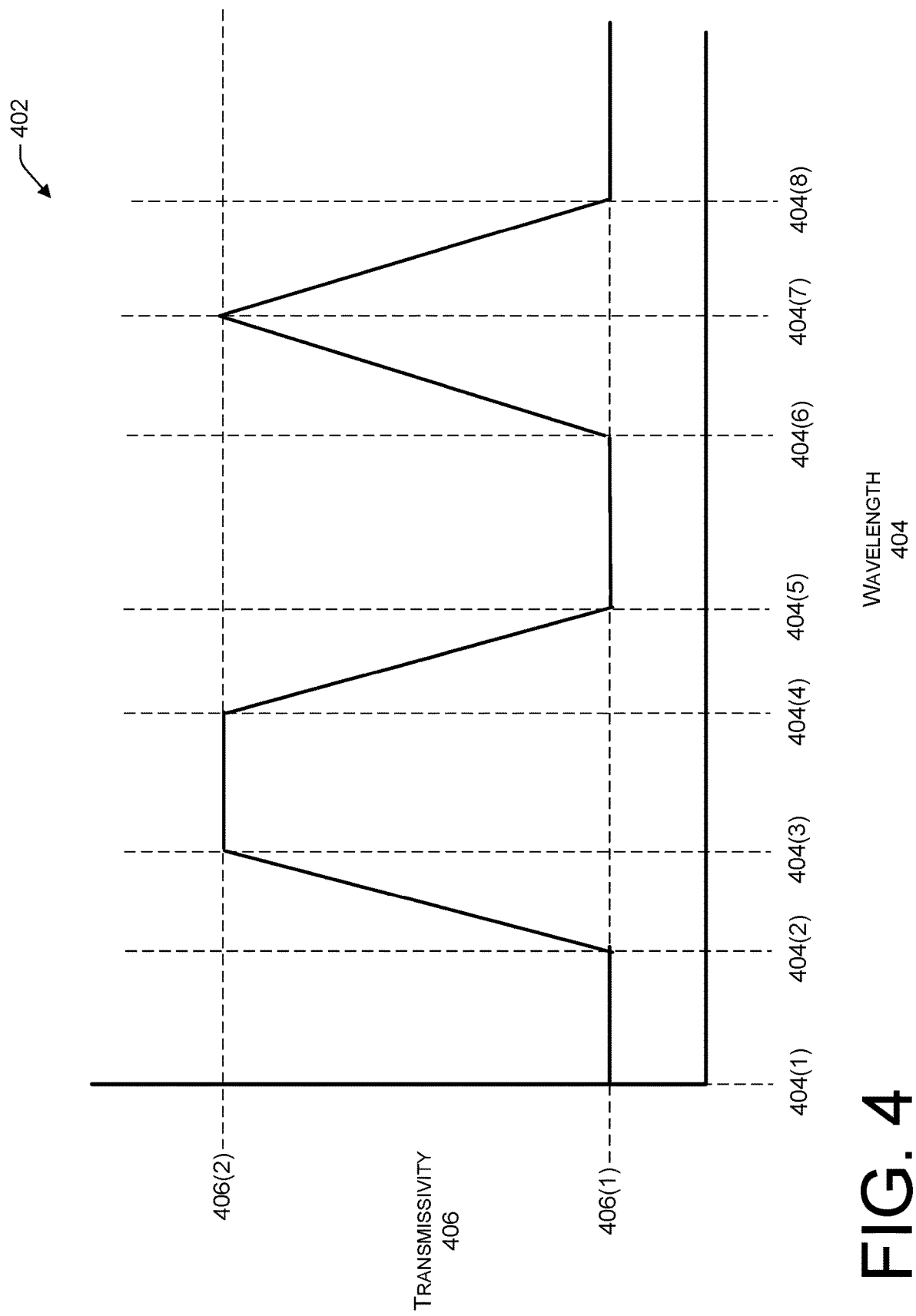
FIG. 4 illustrates an example graph showing wavelengths of light that may be filtered by the filter of FIG. 3.

FIG. 4 illustrates an example graph 402 showing wavelengths of light that may be filtered by the dual band-pass filter 304 of FIG. 3. As shown, the dual band-pass filter 304 may be configured to pass specific wavelengths 404 of light while rejecting other wavelengths 404 of light. For instance, the dual band-pass filter 304 may be configured to pass wavelengths 404 of light that fall within at least a portion of the visible light spectrum and at least a portion of the near-infrared light spectrum (and/or at least a portion of the infrared light spectrum), but reject other wavelengths 404 of light.

For example, and as illustrated, the graph 402 illustrates a transmissivity 406 of the light at various wavelengths 404. As shown, the dual band-pass filter 304 may include a first transmissivity 406(1) for light that is between a first wavelength 404(1) and a second wavelength 404(2). In some instances, the first wavelength 404(1) is approximately 0 nanometers (nm) while the second wavelength 404(2) is between 350 nm and 450 nm. Additionally, the first transmissivity 406(1) is between 0% and 20% (e.g., 10%). The transmissivity 406 for the light may then increase between the second wavelength 404(2) and a third wavelength 404(3). The third wavelength 404(3) may be between 400 nm and 500 nm. As shown, the transmissivity 406 increases to a second transmissivity 406(2), which may be approximately 100%.

The transmissivity 406 for the light then remains approximately equal to the second transmissivity 406(2) between the third wavelength 404(3) and a fourth wavelength 404(4). The fourth wavelength 404(4) may be between 650 nm and 750 nm. Next, the transmissivity 406 for the light may decrease between the fourth wavelength 404(4) and a fifth wavelength 404(5). The fifth wavelength 404(5) may be between 750 nm and 850 nm. As shown, the transmissivity 406 for the fifth wavelength 404(5) is approximately equal to the first transmissivity 406(1).

The transmissivity 406 for the light then remains approximately equal to the first transmissivity 406(1) between the fifth wavelength 404(5) and a sixth wavelength 404(6). The sixth wavelength 404(6) may be between 750 nm and 850 nm. Next, the transmissivity 406 for the light may increase between the sixth wavelength 404(6) and a seventh wavelength 404(7). The seventh wavelength 404(7) may be between 900 nm and 1000 nm. As shown, the transmissivity 406 for the seventh wavelength 404(7) is approximately equal to the second transmissivity 406(2).

Next, the transmissivity 406 for the light may decrease between the seventh wavelength 404(7) and an eighth wavelength 404(8). The eighth wavelength 404(8) may be between 950 nm and 1050 nm. As shown, the transmissivity 406 for the eighth wavelength 404(8) is approximately equal to the first transmissivity 406(1). The transmissivity 406 may then remain approximately equal to the first transmissivity 406(1) for light that includes a wavelength 404 larger than the eighth wavelength 404(8).

The example of FIG. 4 illustrates that the dual band-pass filter 304 may allow wavelengths 404 of light that fall within the visible light spectrum to pass. This may be illustrated as the wavelengths 404 of light between the second wavelength 404(2) and the fifth wavelength 404(5). The example of FIG. 4 also illustrates that the dual band-pass filter 304 may allow wavelengths 404 of light that fall within the near-infrared light spectrum to pass. This may be illustrated as the wavelengths 404 of light between the sixth wavelength 404(6) and the eighth wavelength 404(8).

Figure 5:
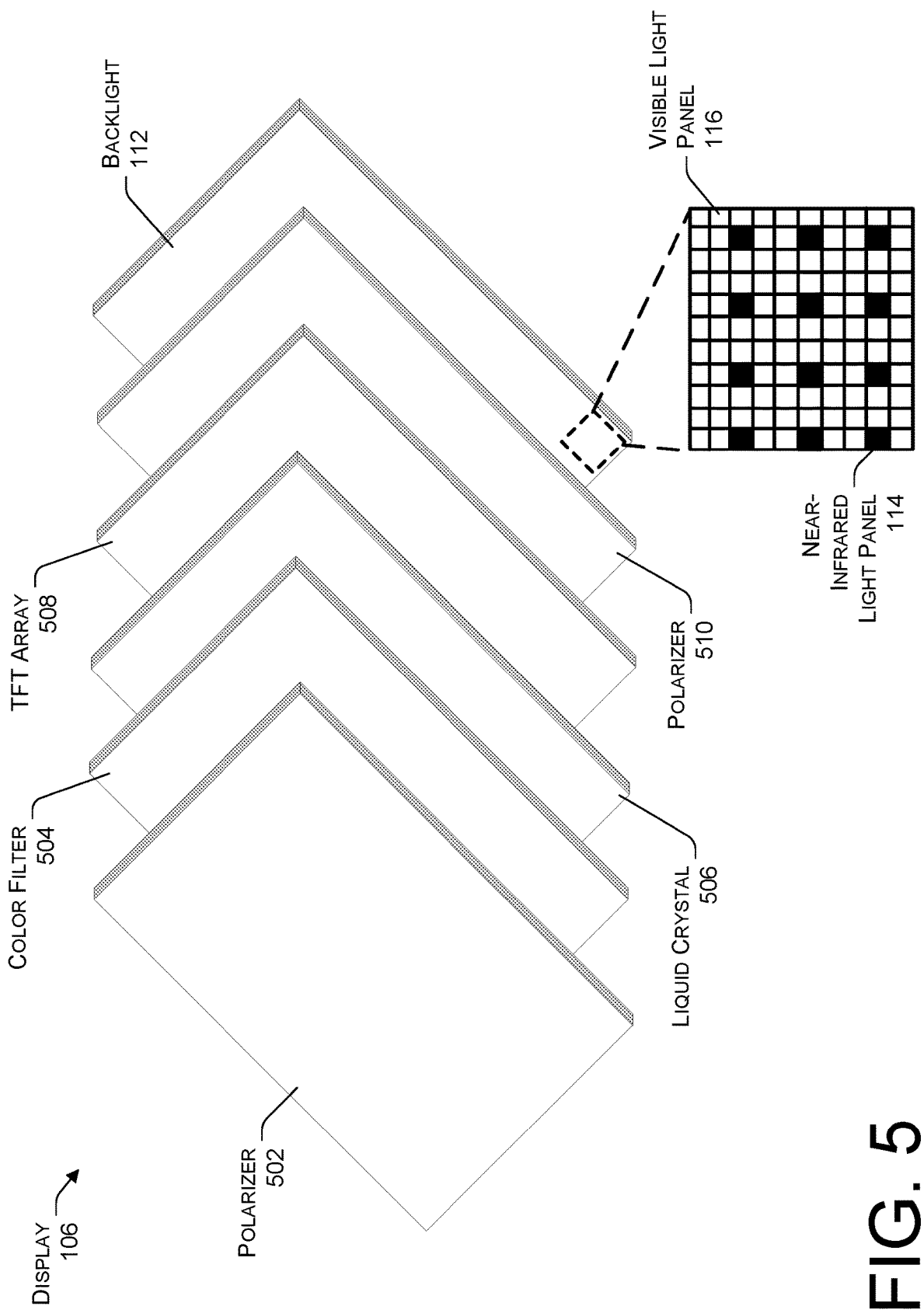
FIG. 5 illustrates an example display stack that may be used for the example electronic device of FIG. 1.

FIG. 5 illustrates an example display stack that may be used for the electronic device 102 of FIG. 1. As shown, the display stack may include a first polarizer 502, a color filer 504, a light crystal 506 layer, a thin-film transistor (TFT) array 508, a second polarizer 510, and the backlight 112. The example of FIG. 5 also illustrates how the backlight 112 includes the near-infrared light panels 114 and the visible light panels 116.

In some instances, the backlight 112 includes the visible light panels 116 that are configured to provide the while backlight for the display 106. The visible light panels 116 may be spaced equally and the display 106 may include diffractive elements that spread the visible light uniformly across the display 106. The visible light panels 116 are then interleaved with the near-infrared light panels 116. As such, the display 106 will also emit the near-infrared light with the visible light. Additionally, in some instances, and if the display 106 includes a Liquid-Crystal Display (LCD), by interleaving the visible light panels 116 with the near-infrared light panels 116, none of the pixels of the LCD are replaced by an extra illuminator. This is because the LEDs are behind the LCD panel and the LCD is transparent to the near-infrared light.

Figure 6:
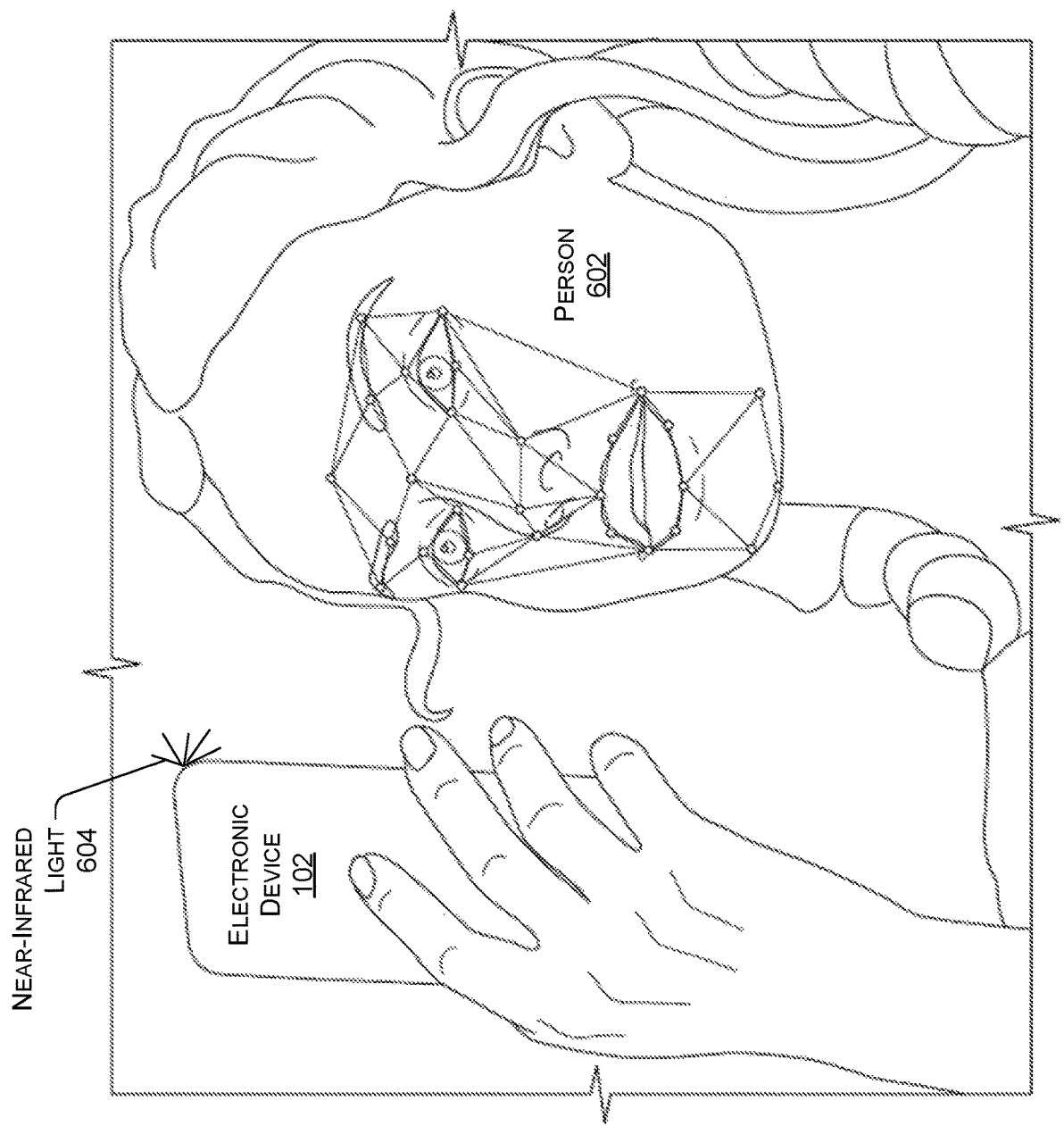
FIG. 6 illustrates an example of the example electronic device from FIG. 1 outputting near-infrared light when performing the biometric processing techniques.

FIG. 6 illustrates an example of the electronic device 102 from FIG. 1 performing facial recognition and/or iris recognition on a person 602. For example, the electronic device 102 may be outputting near-infrared light 604 using the illuminator 108 and/or the near-infrared light panels 114. While outputting the near-infrared light 602, the electronic device 102 may use the imaging device 104 to generate the image data 204 representing the person 602. The biometric processing component 202 may then process the image data 204 using the first image processor 214 in order to generate the first data 216 and the second data 218. Additionally, the biometric processing component 202 may process the second data 218 using the second image processor 220 in order to generate the third data 222. In some instances, the electronic device 102 may then use the third data 222, which may include image data, to display image(s) depicting the person 602.

Additionally, the biometric processing component 202 may use the facial recognition component 226 in order to process the second data 218 and/or the third data 222. Based on the processing, the facial recognition component 226 may output the fourth data 228 indicating that a user of the electronic device 102 has been identified and/or indicating an identity of the person 602. Furthermore, the biometric processing component 202 may use the iris recognition component 230 in order to process the second data 218. Based on the processing, the iris recognition component 230 may output the fifth data 232 indicating that the user of the electronic device 102 has been identified and/or indicating the identity of the person 602.

Figure 7:
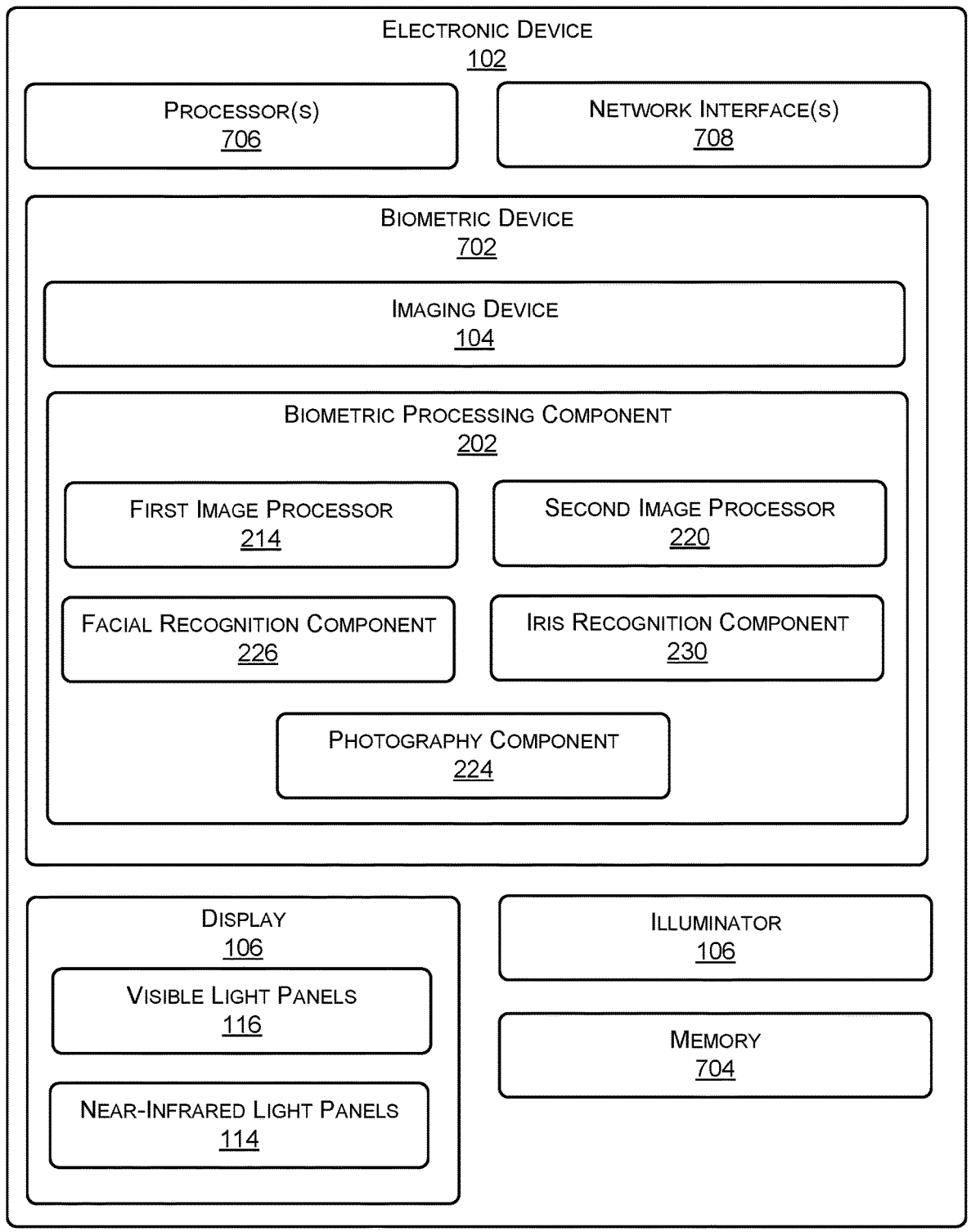
FIG. 7 illustrates a block diagram of the example electronic device from FIG. 1 that performs the biometric identification techniques.

FIG. 7 illustrates a block diagram of the electronic device 102 that performs the biometric identification techniques. As shown, the electronic device 102 may include a biometric device 702. In the example of FIG. 7, the biometric device 702 may include the imaging device 104 and the biometric processing component 202. However, in other examples, the biometric device 702 may not include the biometric processing component 202 and/or one or more components (e.g., the first image processor 214, the second image processor 220, the facial recognition component 226, the iris recognition component 230, and/or the photography component 224) of the biometric processing component 202. For example, the biometric processing component 202 and/or one or more components of the biometric processing component 202 may be included as part of the electronic device 102 and separate from the biometric device 702.

In some instances, one or more components of the biometric processing component 202 may include hardware components. Additionally, or alternatively, in some instances, the one or more components of the biometric processing component 202 may include software components. Additionally, in instances where one or more of the components are software components, the one or more components may alternatively be stored in a memory 704 of the electronic device 102. In other words, the biometric identification techniques described herein may performed by the biometric device 702, the electronic device 102, but separate from the biometric device 702, and/or split between the biometric device 702 and the electronic device 102.

As further illustrated in the example of FIG. 7, the electronic device 102 includes both the near-infrared light panels 114 and the illuminator 108. However, in other examples, the electronic device 102 may only include one of the near-infrared light panels 114 or the illuminator 108. Additionally, in other examples, the electronic device 102 may include one or more additional and/or alternative near-infrared light illuminators that are configured to output the near-infrared light.

As further illustrated in FIG. 7, the electronic device 102 includes processor(s) 706, network interface(s) 708, and the memory 704. As used herein, a processor, such as the processor(s) 706, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) 706 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) 706 may possess its own local memory, which also may store program components, program data, and/or one or more operating systems.

The memory 704 may include volatile and nonvolatile memory, removable and non-removable media implemented in any method or technology for storage of information, such as computer-readable instructions, data structures, program component, or other data. The memory 704 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 704 may be implemented as computer-readable storage media ("CRSM"), which may be any available physical media accessible by the processor(s) 706 to execute instructions stored on the memory 704. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as the memory 704, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 708 may enable the electronic device 102 to send data to and/or receive data from other electronic device(s). The network interface(s) 708 may include one or more network interface controllers (NICs) or other types of transceiver devices to send and receive data over the network. For instance, the network interface(s) 708 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) 708 may include a wide area network (WAN) component to enable message over a wide area network. Moreover, the network interface(s) may enable the electronic device 102 to communicate using a Controller Area Network bus.

Figure 8:
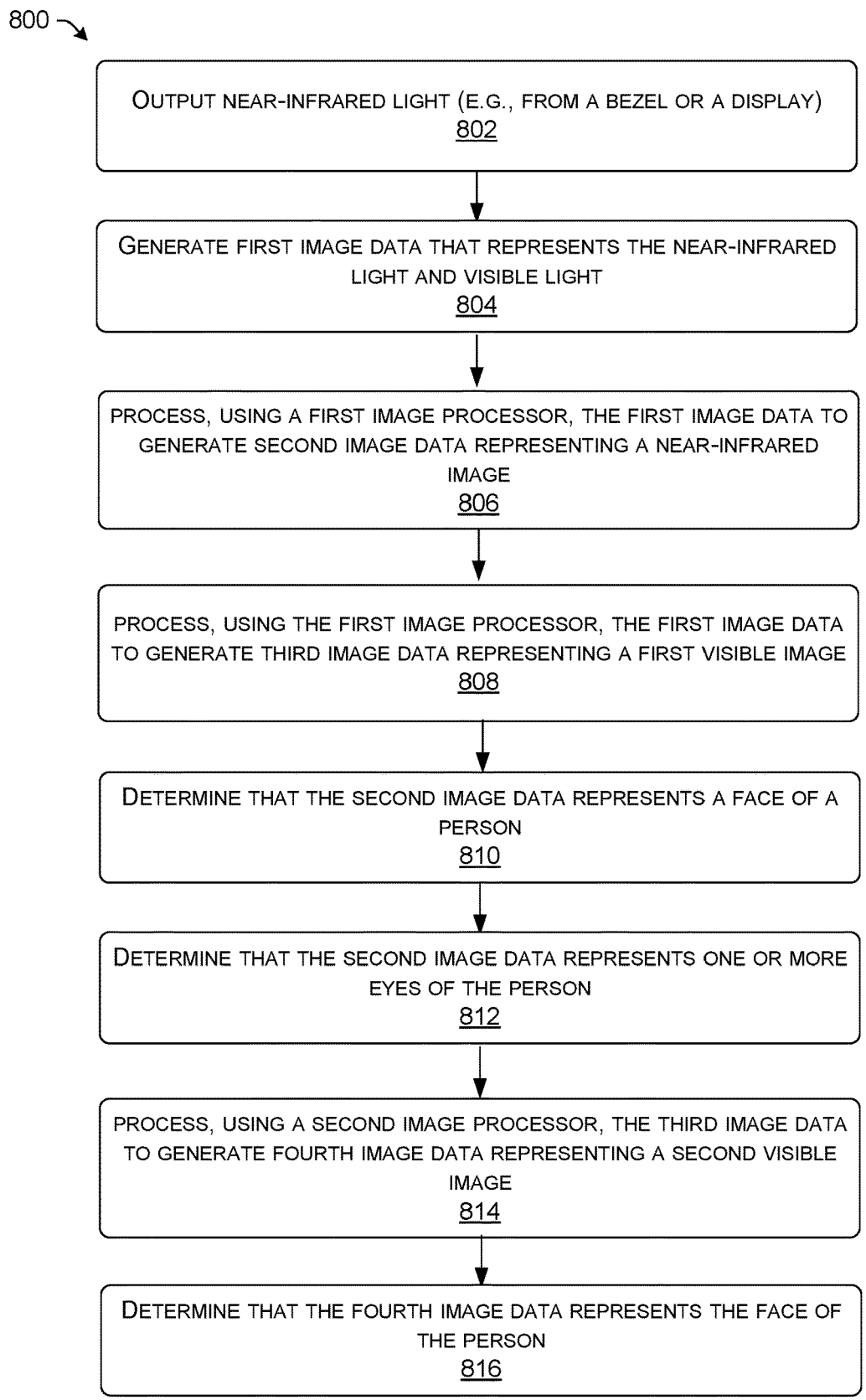
FIG. 8 illustrates an example process of an electronic device performing biometric identification techniques.
Figure 9:
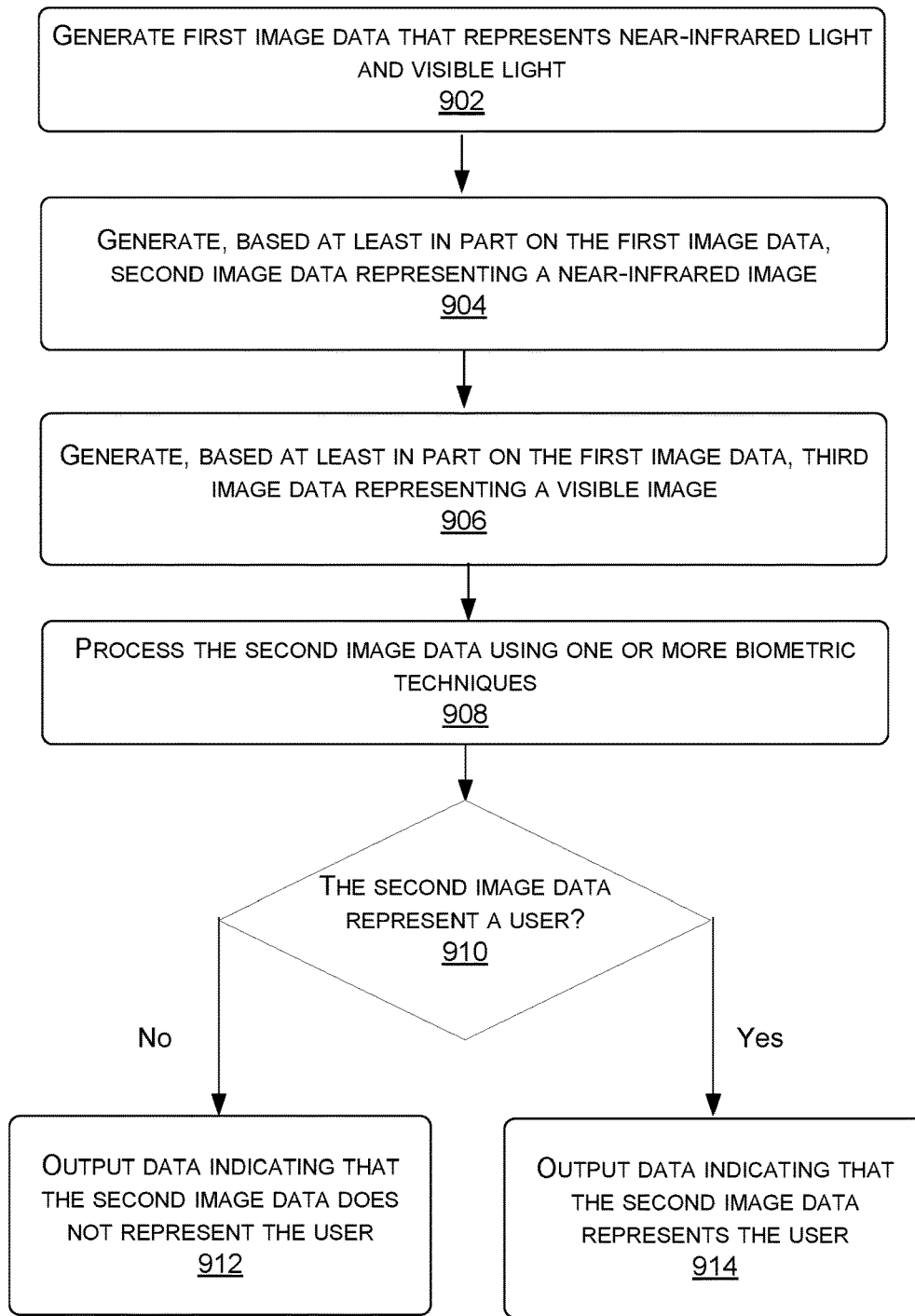
FIG. 9 illustrates an example process for performing biometric identification techniques using an imaging device of an electronic device.

FIGS. 8-9 illustrate example processes for performing biometric identification techniques. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 8 illustrates an example process 800 of an electronic device performing biometric identification techniques. At 802, the process 800 may include outputting near-infrared light. For instance, the electronic device may output the near-infrared light using one or more near-infrared light illuminators. In some instances, the one or more near-infrared light illuminators include at least a near-infrared light illuminator located within a bezel of the electronic device. Additionally, or alternatively, in some instances, the one or more near-infrared light emitters include one or more near-infrared light panels of a display of the electronic device.

At 804, the process 800 may include generating first image data that represents the near-infrared light and visible light. For instance, the electronic device may use an imaging device located at a front of the electronic device to generate the first image data. The first image data may represent red pixels, green pixels, blue pixels, and infrared pixels. In some instances, the first image data may further represent a face of a person in possession of the electronic device. For example, the person may be trying to unlock the electronic device using the biometric identification techniques described herein.

At 806, the process 800 may include processing, using a first image processor, the first image data to generate second image data representing a near-infrared image. For instance, the electronic device may process the first image data using the first image processor in order to generate the second image data. The first image processor may generate the second image data using the infrared pixels from the first image data. For example, the first image processor may at least separate the infrared pixels from the other pixels. As such, the second image data may represent the near-infrared image depicting the person in possession of the electronic device.

At 808, the process 800 may include processing, using the first image processor, the first image data to generate third image data representing a first visible image. For instance, the electronic device may further process the first image data using the first image processor in order to generate the third image data. The first image processor may generate the third image data using the red pixels, green pixels, and blue pixels from the first image data. For example, and as discussed above, the first image processor may at least separate the red pixels, green pixels, and blue pixels from the infrared pixels. As such, the third image data may represent the first visible image of the person in possession of the electronic device.

At 810, the process 800 may include determining that the second image data represents a face of a person and at 812, the process 800 may include determining that the second image data represents one or more eyes of the person. For instance, the electronic device may process the second image data using one or more facial recognition techniques. Based on the processing, the electronic device may determine that the second image data represents the face of the person and/or determine the identity of the person. Additionally, the electronic device may process the second image data using one or more iris recognition techniques. Based on the processing, the electronic device may determine that the second image data represents the one or more eyes of the person and/or determine the identity of the person.

At 814, the process 800 may include processing, using a second image processor, the third image data to generate fourth image data representing a second visible image. For instance, the electronic device may process the third image data using the second image processor in order to generate the fourth image data. In some instances, the second image processor may execute one or more algorithms that correct the imaging device's lens shading and curvature, reduce noise, and/or perform other image quality processing. In some instances, the electronic device may then display the second visible image.

At 816, the process 800 may include determining that the fourth image data represents the face of the person. For instance, the electronic device may process the fourth image data using one or more facial recognition techniques. Based on the processing, the electronic device may determine that the fourth image data represents the face of the person and/or determine the identity of the person. In some instances, the electronic device may then perform one or more processes based on the second image data representing the face of the person, the second image data representing the one or more eyes of the person, the fourth image data representing the face of the person, and/or the identity of the person. For example, the electronic device may unlock, execute an application, log into an application, and/or perform one or more alternative and/or additional processes.

FIG. 9 illustrates an example process 900 for performing biometric identification techniques an imaging device. At 902, the process 900 may include generating first image data that represents near-infrared light and visible light. For instance, an electronic device may use an imaging device located at a front of the electronic device to generate the first image data. The first image data may represent red pixels, green pixels, blue pixels, and infrared pixels. In some instances, the first image data may further represent a face of a person in possession of the electronic device. For example, a user of the electronic device may be trying to unlock the electronic device using the biometric identification techniques described herein.

At 904, the process 900 may include generating, based at least in part on the first image data, second image data representing a near-infrared image. For instance, the electronic device may process the first image data using one or more image processors in order to generate the second image data. The one or more image processors may generate the second image data using the infrared pixels from the first image data. As such, the second image data may represent the near-infrared image depicting the person in possession of the electronic device.

At 906, the process 900 may include generating, based at least in part on the first image data, third image data representing a visible image. For instance, the electronic device may further process the first image data using the one or more image processors in order to generate the third image data. The one or more image processors may generate the third image data using the red pixels, green pixels, and blue pixels from the first image data. As such, the third image data may represent the visible image of the user in possession of the electronic device.

At 908, the process 900 may include processing the second image data using one or more biometric techniques. For instance, the electronic device may process the second image data using the one or more biometric techniques. The one or more biometric techniques may include, but are not limited to, facial recognition and/or iris recognition. In some instances, the electronic device may further analyze the third image data using the one or more biometric techniques.

At 910, the process 900 may include determining if the second image data represents a user. For instances, based on the analysis, the electronic device may determine if the second image data represents a user of the electronic device. If, at 910, the process 900 determines that the second image data does not represent the user, then at 912, the process 900 may include outputting data indicating that the second image data does not represent the user. For instance, if the electronic device determines that the second image data does not represent the user (e.g., the person in possession of the electronic device is not the user), then the electronic device may generate the data indicating that the second electronic device does not represent the user. In some instances, the electronic device may then display an indication that the second image data does not represent the user.

However, if, at 910, the process 900 determines that the second image data does represent the user, then at 914, the process 900 may include outputting data indicating that the second image data does represent the user. For instance, if the electronic device determines that the second image data does represent the user, then the electronic device may generate the data indicating that the second electronic device does represent the user. In some instances, the electronic device may then display an indication that the second image data does represent the user.

CONCLUSION

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

What is claimed is:

1. A mobile device comprising:
a display, the display including one or more visible light panels and one or more near-infrared light panels;
a camera;
a bezel; and
at least one near-infrared illuminator located in or on the bezel;
one or more processors; and
one or more computer-readable media storing instructions that, when executed by the one or more processors, cause the mobile device to perform operations comprising:
causing the one or more near-infrared light panels to output near-infrared light;
causing the at least one near-infrared illuminator to output additional near-infrared light;
generating first image data using the camera, the first image data representing the near-infrared light, the additional near-infrared light, and visible light;
processing, by an image processor, the first image data in order generate:
second image data representing a near-infrared image; and
third image data representing a visible image;
processing, by a facial recognition component, the second image data; and
determining, based at least in part on the processing by the facial recognition component, that the second image data represents a face of a person.

2. The mobile device as recited in claim 1, the operations further comprising:
processing, by an iris recognition component, the second image data; and
determining, based at least in part on the processing by the iris recognition component, that the second image data represents one or more eyes of the person.

3. The mobile device as recited in claim 1, wherein the image processor is a first image processor, and wherein the operations further comprise:
processing, by a second image processor, the third image data in order to generate fourth image data representing an additional visible image; and
presenting the additional visible image using the display.

4. The mobile device as recited in claim 3, the operations further comprising:
processing, by a facial recognition component, the fourth image data; and
determining, based at least in part on the processing by the facial recognition component, that the fourth image data represents the face of the person.

5. An electronic device comprising:
a camera;
a display, the display including one or more near-infrared pixels;
a bezel;
at least one near-infrared illuminator located in or on the bezel;
one or more processors; and
one or more computer-readable media storing instructions that, when executed by the one or more processors, cause the electronic device to perform operations comprising:
causing the one or more near-infrared pixels to output a first portion of near-infrared light;
causing the at least one near-infrared illuminator to output a second portion of near-infrared light;
generating first image data using the camera, the first image data representing the first portion of near-infrared light, the second portion of near-infrared light, and visible light;
generating, by an image processor and based at least in part on the first image data, second image data representing a near-infrared image;
generating, by the image processor and based at least in part on the first image data, third image data representing a visible image; and
determining that the second image data represents a person.

6. The electronic device as recited in claim 5, wherein the display includes one or more visible light panels to output the visible light.

7. The electronic device as recited in claim 6, wherein the one or more near-infrared pixels represent one or more near-infrared panels of a backlight of the display.

8. The electronic device as recited in claim 5, wherein the determining that the second image data represents the person comprises:
processing, by a facial recognition component, the second image data; and
determining, based at least in part on the processing by the facial recognition component, that the second image data represents a face of the person.

9. The electronic device as recited in claim 5, wherein the determining that the second image data represents the person comprises:
processing, by an iris recognition component, the second image data; and
determining, based at least in part on the processing by the iris recognition component, that the second image data represents one or more eyes of the person.

10. The electronic device as recited in claim 5, wherein the determining that the second image data represents the person comprises:

processing, by a facial recognition component, the second image data;

determining, based at least in part on the processing by the facial recognition component, that the second image data represents a face of the person;

processing, by an iris recognition component, the second image data; and determining, based at least in part on the processing by the iris recognition component, that the second image data represents one or more eyes of the person.

11. The electronic device as recited in claim 5, wherein the image processor is a first image processor, and wherein the operations further comprise generating, by a second image processor and based at least in part on the third image data, fourth image data representing an additional visible image.

12. The electronic device as recited in claim 11, the operations further comprising determining that the fourth image data represents the person.

13. A method comprising:

causing one or more near-infrared pixels included in a display of an electronic device to output a first portion of near-infrared light;

causing at least one near-infrared illuminator located in or on a bezel of the electronic device to output a second portion of near-infrared light;

generating first image data using a camera of the electronic device, the first image data representing the first portion of near-infrared light, the second portion of near-infrared light, and visible light;

generating, using an image processor and based at least in part on the first image data, second image data representing a near-infrared image;

generating, using the image processor and based at least in part on the first image data, third image data representing a visible image; and determining that the second image data represents a person.

14. The method as recited in claim 13, wherein the one or more near-infrared pixels represent one or more near-infrared panels located within the display of the electronic device.

15. The method as recited in claim 13, wherein the determining that the second image data represents the person comprises:

processing, by a facial recognition component, the second image data; and determining, based at least in part on the processing by the facial recognition component, that the second image data represents a face of the person.

16. The method as recited in claim 13, wherein the determining that the second image data represents the person comprises:

processing, by an iris recognition component, the second image data; and determining, based at least in part on the processing by the iris recognition component, that the second image data represents one or more eyes of the person.

17. The mobile device as recited in claim 1, wherein the display includes one or more of:

a visible light panel, a polarizer, a liquid crystal panel, or a color filter.

18. The electronic device as recited in claim 5, wherein the operations further comprise determining an identity of the person based at least in part on the second image data.

19. The method as recited in claim 13, wherein the image processor is a first image processor, and further comprising generating, by a second image processor and based at least in part on the third image data, fourth image data representing an additional visible image.

20. The method as recited in claim 13, further comprising determining an identity of the person based at least in part on the second image data.

* * * * *